No. 662,042. Patented Nov. 20, 1900.
F. W. THROOP.
DYNAMO ELECTRIC MACHINE.
(Application filed Jan. 29, 1900. Renewed Oct. 15, 1900.)
(No Model.) 3 Sheets—Sheet 2.
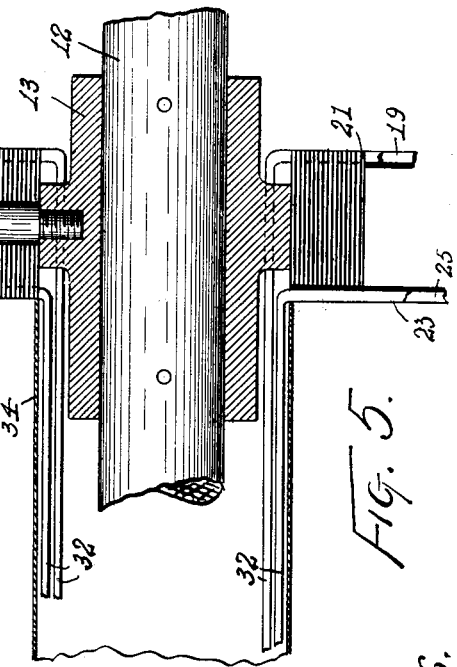
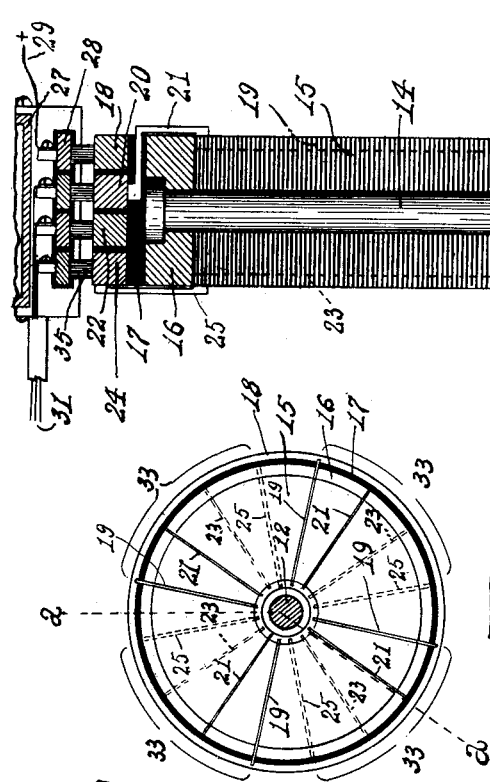
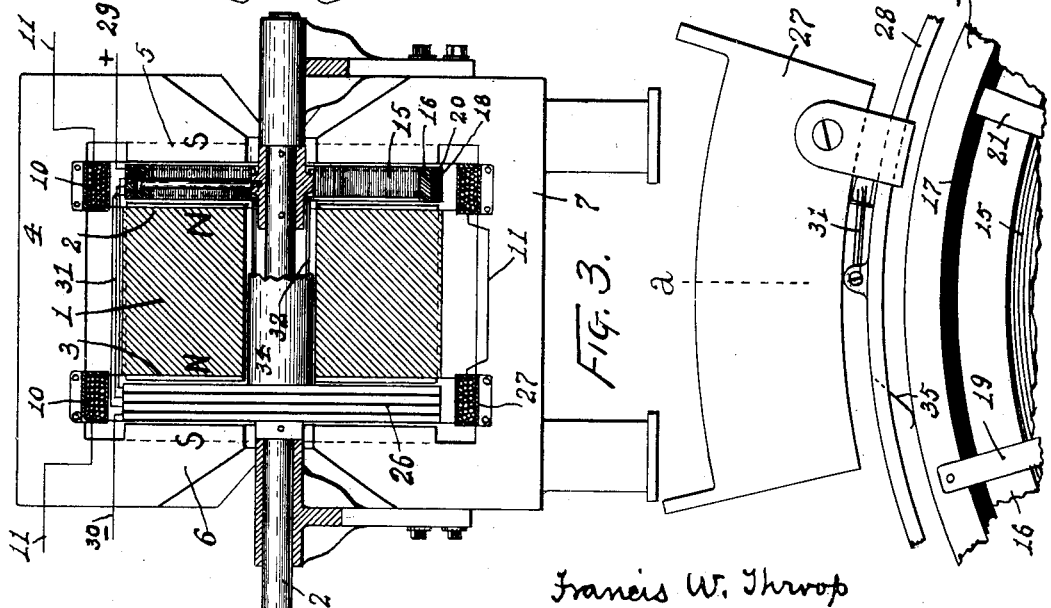
Witnesses:
E. R. Shipley
M. S. Belden
Francis W. Throop
Inventor
by James W. See
Attorney

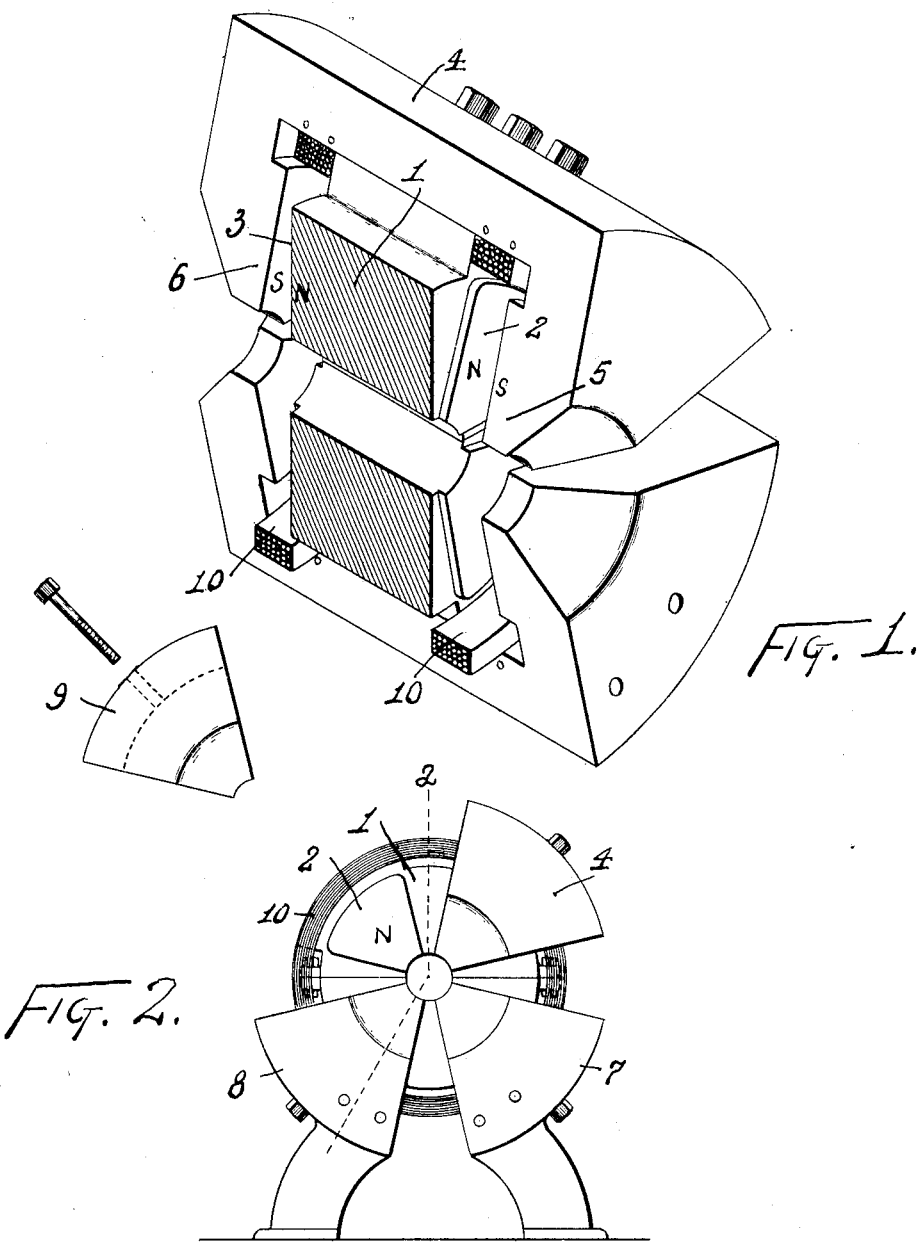

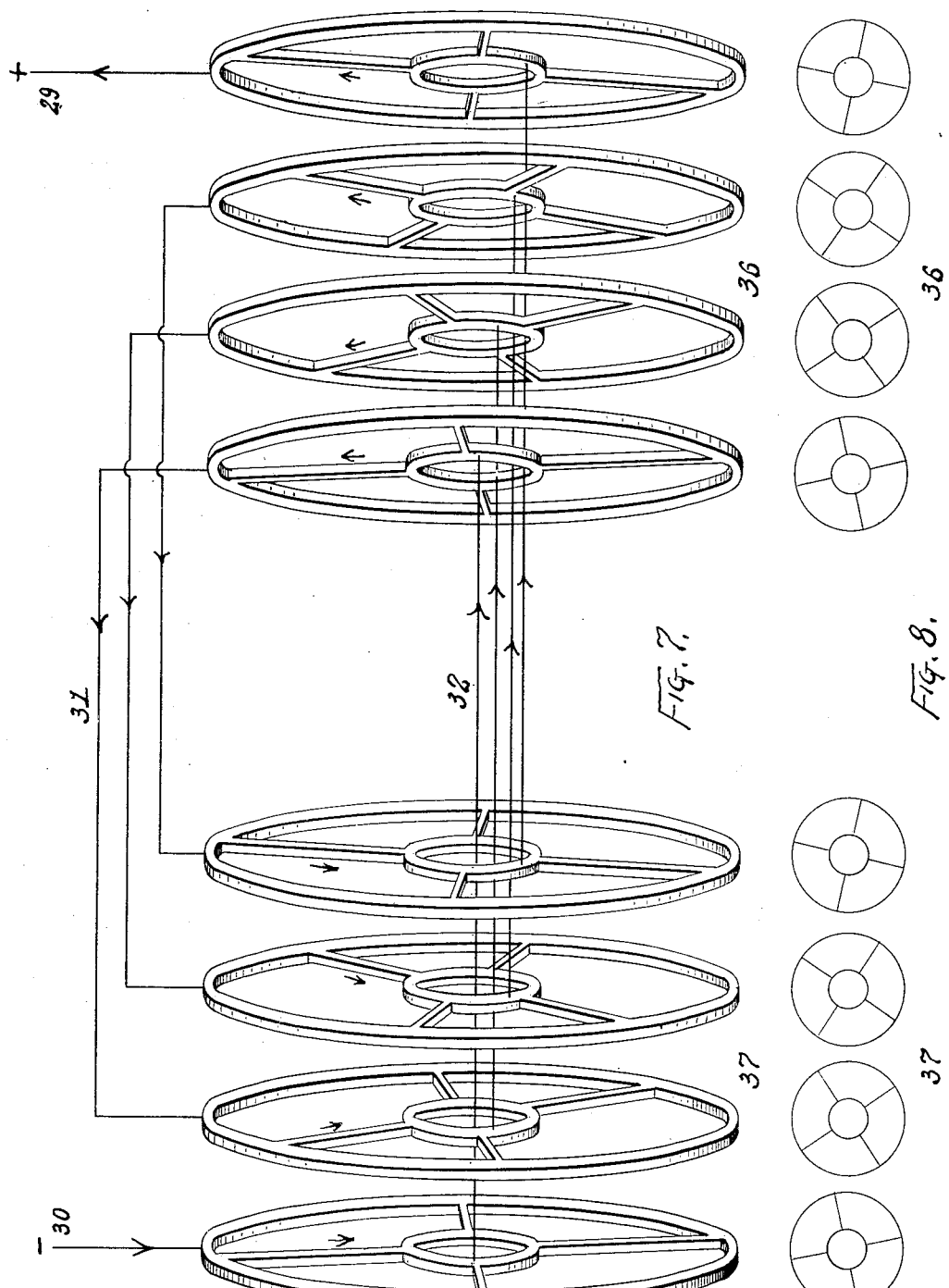

UNITED STATES PATENT OFFICE.

FRANCIS W. THROOP, OF NIAGARA FALLS, NEW YORK.

DYNAMO-ELECTRIC MACHINE.

SPECIFICATION forming part of Letters Patent No. 662,042, dated November 20, 1900.

Application filed January 29, 1900. Renewed October 15, 1900. Serial No. 33,105. (No model.)

*To all whom it may concern:*

Be it known that I, FRANCIS W. THROOP, a citizen of the United States, residing at Niagara Falls, Niagara county, New York, (post-office address No. 211 Third street, Niagara Falls, New York,) have invented certain new and useful Improvements in Dynamo-Electric Machines, (Case A,) of which the following is a specification.

My invention pertaining to dynamo-electric machines will be readily understood from the following description, taken in connection with the accompanying drawings.

Have in mind Faraday's disk in which the pole of a magnet contiguous to the face of a rotating disk of conducting material develops a current in a circuit comprising that radius of the disk which is at the instant in the magnetic field, and remember that Barlow or Sturgeon placed opposite magnetic poles at the opposite sides of a disk and caused the disk to rotate by passing a current through that radius of the disk which at the instant cut the magnetic field. My dynamo-electric machine is derived from the Faraday disk straddled by the opposite poles of a magnet. Considering first a mere disk of conducting non-magnetic material cutting the field between the poles of a magnet, I skeletonize the disk till it becomes merely a radial inductor intermittently cutting the magnetic field, the main circuit continuously including this radial inductor, whereby there is produced an undulatory current as the inductor sweeps in and out of the magnetic field. Between the poles of another magnet I place a similar rotating radial inductor similarly included in the main circuit, the two inductors turning in unison. I so extend the poles angularly and so relate the two inductors angularly that as one sweeps out of the magnetic field the other sweeps into the field, thus avoiding pulsations of current. By substituting a substantially radial inductor for the disk of Faraday I avoid the losses due to Foucault currents. I next provide each of the angularly-extended magnets with a second radial inductor, the four inductors being in the main circuit and alternating with each other in the series, thus first an inductor of magnet No. 1, then an inductor of magnet No. 2, then an inductor of magnet No. 1, and then an inductor of magnet No. 2, the inductors all turning in unison and being related at equal angles, so that the number of inductors in fields is constant. Similarly at each magnet I increase the number of inductors to any desired or practical extent, the inductors of the two sets being alternately arranged in series, as in the instance just given. I make the polarity of the two magnets opposite, so that the currents move outwardly through the inductors of one magnet and inwardly through the inductors of the other magnet. I provide each set of inductors with a reinforcing mass or disk of magnetic material. I provide the inductors with circular rims to permit of the circuit being continuously in connection with them. Taking a given inductor with its rim, I add other radial inductors to the same rim, the result being that at each magnet there are separate groups of inductors, each magnet thus dealing with an armature formed of several groups of inductors and a reinforcing-core, the core being of disk form upon or within which the inductors are disposed. I next multiply the number of magnets at each armature, thus causing each inductor after passing out of one magnetic field to quickly pass into a similar field, the inductors of a given armature thus cutting with high frequency through fields of constant polarity. I next so associate the two sets of magnets that the pole of one sign of one of the sets of magnets will serve also as the pole of the same sign for the other set.

Proceeding with a description of the exemplifying machine, Figure 1, in the accompanying drawings, is a vertical longitudinal perspective section of the field-magnet, considered as a unit, and its energizing-coils, the section being in the plane of line *a* of Fig. 2; Fig. 2, an end view of the field magnet and coils with one of its outer pole-pieces displaced diagonally upward; Fig. 3, a vertical longitudinal section of the machine in the plane of line *a* of Fig. 2, the left-hand armature appearing in elevation; Fig. 4, an elevation of the right-hand face of the right-hand armature; Fig. 5, an enlarged vertical longitudinal section in the plane of line *a* of a portion of the right-hand armature; Fig. 6, an enlarged elevation of a portion of the right-hand face of the right-hand armature; Fig.

7, a diagram illustrating the relation of inductors and the main circuit, and Fig. 8 a diagram illustrating the angular relationship of the various inductors.

In the drawings, 1 indicates a cylindrical mass of iron bored for the passage of the armature-shaft and preferably divided longitudinally, as seen in Fig. 2, this mass constituting one of the poles for each of the disklike armatures; 2, a series of four polar faces projecting from one end face of pole 1, these polar faces being each sixty-seven and one-half degrees in angular extent, gaps of twenty-two and one-half degrees angular extent coming between them, these four polar faces in the present instance being assumed as having north polarity; 3, a similar set of four polar faces projecting from the opposite end of pole 1 and having the same polar sign, pole 1 thus furnishing eight polar faces of north polarity; 4, a polar yoke secured longitudinally upon the periphery of pole 1; 5, an arm projecting inwardly from the right-hand end of yoke 4 and presenting a polar face parallel with one of polar faces 2 and of equal angular extent, the inner face of this arm forming a pole of south polarity; 6, a similar arm at the left end of yoke 4, also of south polarity, 5 and 6 thus constituting the two south poles and 1 with its faces 2 and 3 the consequent north pole of a magnet; 7, 8, and 9, additional similar-armed yokes presenting polar faces opposite the remaining polar faces of pole 1, pole 1 thus presenting at each end four polar faces of north polarity while the yokes provide an equal number of opposing faces of opposite sign; 10, field-coils "disposed," so to speak, as hoops encircling the disk-like armature-spaces of the magnet, these hoops seating outwardly against yokes 4, 7, 8, and 9; 11, circuit connections of the field-coils, the same to be put to self-exciting or to separate-exciting circuit, as desired; 12, the armature-shaft axially mounted in the magnet and running in suitable journal-boxes, this shaft to carry a disk-like armature in each of the armature-spaces of the magnet, which armatures being alike will now be described in the singular; 13, armature-hub fast on the shaft; 14, the four armature-spokes screwing radially into the armature-hub; 15, the armature-core consisting of concentric laminations of soft iron encircling the hub and radially pierced by the spokes, the core thus formed producing a disk of a thickness suited for running between the polar faces of the magnet with such air-gaps at its faces as practical considerations may suggest; 16, a strengthening-hoop encircling the armature-core and engaged by the spokes; 17, a hoop of insulating material surrounding strengthening-hoop 16; 18, a first collector-ring surrounding the armature at the outer face thereof and exterior to insulating-hoop 17, this ring forming the rim of what has heretofore been elementally referred to as one of the "skeletonized" Faraday disks; 19, (see Fig. 4,) four radial inductors disposed in equal grooves in the outer face of the laminated core 15 and insulated from the metal of the core, the outer ends of these inductors being connected with first collector-ring 18, these inductors 19 constituting what I will call the "first group" of inductors, the group having collector-ring 18 in common; 20, a second collector-ring on the armature similar to the first one; 21, a group of four radial inductors equally spaced and disposed between inductors 19, the outer ends of these inductors being connected with collector-ring 20, inductors 21 constituting the second group of inductors; 22, a third collector-ring on the armature; 23, a third group of four radial inductors on the armature angularly spaced between inductors 19 and 21 and having their outer ends connected with collector-ring 22; 24, a fourth collector-ring on the armature; 25, a fourth group of four radial inductors angularly disposed between inductors 19 and 21 and having their outer ends connected with collector-ring 24, the right-hand armature thus far referred to thus presenting a series of sixteen equally-spaced radial inductors in four groups, each group having its collector-ring, the order of circumferential arrangement of the inductors being such that an inductor of the first group is followed by one of the second group, and that by one of the third group, and that by one of the fourth group, and that again by another one of the first group, and so on; 26, Fig. 3, the left-hand armature, similar in all respects to the one that has been described; 27, jacket-tubes protecting field-coils 10 where they cross the gaps between the magnet-yokes; 28, a series of four brush-rings surrounding each armature and held in fixed position by suitable holders, one of these rings encircling each of the collector-rings of the armature, as seen in Figs. 5 and 6, these brush-rings being omitted from Fig. 3 in order to permit of direct delineation of the circuits; 29, one terminal of the main circuit, the same going to the brush-ring pertaining to first collector-ring 18, and thus to the first group of radial inductors on the right-hand armature; 30, the other terminal of the main circuit, the same going to the last brush-ring of the left-hand armature, and thus to the fourth group of inductors of that armature; 31, cross-connectors between the two sets of brush-rings, whereby the second brush-ring of the right-hand armature is connected with the first brush-ring of the left-hand armature, the third ring of the right-hand armature with the second one of the left, and the fourth ring of the right-hand armature with the third one of the left-hand one; 32, cross-connectors between the inner ends of the radial inductors, whereby the inner ends of the four inductors 19 of the first right-hand group are connected with the inner ends of the four right-hand inductors of the left-hand armature, the four of the second right-hand group with the four of the second of the left-hand group, the four of the third right-hand group with the four of the third left-hand group, and the four of the fourth right-hand group with the four of the fourth left-hand group, the entire circuit from 29 to 30 being clearly shown diagrammatically in Fig. 7; 33, Fig. 4, delineating-brackets indicating the angular extent and relative disposition of the fixed magnetic fields swept through by the inductors of the rotating armature; 34, a protecting-tube around the armature-shaft between the two armatures and covering the central cross-connectors 32, and 35 the brushes supported by the brush-rings 28 and engaging their appropriate collecting-rings.

It may be here stated that the radial inductors may be disposed in initial slots in the faces of the laminated core, as shown, some of them being at one face of the core and others at the other face; or, if desired, all may be upon one face or all or some may be inserted in radial apertures in the core, the inductors being properly insulated from the cores. It should also be stated that the brush-rings 28 are merely an expedient for providing that, if desired, each collector-ring may be engaged at several points in order to effect a more equitable distribution of the current through the inductors. The field-coils may, as heretofore stated, be connected up either for self-exciting by the machine or with separate-exciting circuit, as desired.

The rationale of the machine may best be gathered from Figs. 7 and 8, in which 36 indicates the four groups of inductors of the right-hand armature and 37 the four groups of inductors of the left-hand armature, the individual inductors of each set having such angular disposition, as seen in Fig. 8, that they will be twenty-two and one-half degrees apart. Now, looking at Fig. 4, notice that the four polar fields 33 have each an angular extent of sixty-seven and one-half degrees and that they are separated from each other to the angular extent of twenty-two and one-half degrees. By this arrangement the four inductors 19 of the first group simultaneously sweep into the four fields while the four inductors of the next group are sweeping out of four fields, and so on for all the groups of inductors, three groups always sweeping through the field while a fourth group is sweeping through the gaps between the fields. It will be observed that this system of subdivision can be carried further than illustrated and that there is produced a direct current without commutators. It will be noticed in Fig. 7 that the two armatures are in effect in series, their inductors reinforcing each other. The adaptation of the system to motor purposes requires no explanation.

I claim as my invention—

1. In a dynamo-electric machine, the combination, substantially as set forth, of a shaft, a substantially radial inductor carried thereby, a circuit in constant direct connection with the outer and inner ends of said inductor, and magnetic poles of opposite sign disposed at the opposite sides of the plane of revolution of said inductor, the poles on one side of said plane being all of one polarity and those on the opposite side being all of the other polarity.

2. In a dynamo-electric machine, the combination, substantially as set forth, of a shaft, a substantially radial inductor carried thereby, a circuit in constant direct connection with the outer and inner ends of said inductor, magnetic poles of opposite sign disposed at the opposite sides of the plane of revolution of said inductor, and a reinforcing mass of iron carried with but insulated from said inductor.

3. In a dynamo-electric machine, the combination, substantially as set forth, of a shaft, a substantially radial inductor carried thereby, a circuit in constant direct connection with the outer and inner ends of said inductor, and several pairs of magnetic poles straddling the plane of revolution of said inductor, the several pairs of poles being disposed in circumferential series, the poles upon one side of said plane having one sign and that upon the other side having the opposite sign.

4. In a dynamo-electric machine, the combination, substantially as set forth, of a shaft, a series of substantially radial inductors carried thereby, a circuit in constant direct connection with the outer and inner ends of said inductors, and magnetic poles of opposite sign disposed at the opposite sides of the plane of revolution of said inductors, the poles on one side of said plane being all of one polarity and those on the opposite side being all of the other polarity.

5. In a dynamo-electric machine, the combination, substantially as set forth, of a shaft, a series of substantially radial inductors carried thereby, a circuit in constant direct connection with the outer and inner ends of said inductors, and several pairs of magnetic poles straddling the plane of revolution of said inductors, the several pairs of poles being disposed in circumferential series, the poles upon one side of said plane having one sign and that upon the other side having the opposite sign.

6. In a dynamo-electric machine, the combination, substantially as set forth, of a shaft, a series of substantially radial inductors carried thereby, a circuit in constant direct connection with the outer and inner ends of said inductors, magnetic poles of opposite sign disposed at the opposite sides of the plane of revolution of said inductors, and a reinforcing mass of iron carried with but insulated from said inductors.

7. In a dynamo-electric machine, the combination, substantially as set forth, of a shaft, a collecting-ring carried thereby, a substantially radial spoke-like inductor carried by the shaft and having its outer end connected with said ring, a circuit in constant direct connection with said ring and the inner end of said inductor, and magnetic poles of opposite sign disposed at the opposite sides of the plane of revolution of said inductor.

8. In a dynamo-electric machine, the combination, substantially as set forth, of a shaft, a collecting-ring carried thereby, a series of substantially radial inductors carried by the shaft and having their outer ends connected with said ring, a circuit in constant direct connection with said ring and the inner ends of said inductors, and magnetic poles of opposite sign disposed at the opposite sides of the plane of revolution of said inductors, the poles on one side of said plane being all of one polarity and those on the opposite side being all of the other polarity.

9. In a dynamo-electric machine, the combination, substantially as set forth, of a shaft, a disk of iron fast thereon, radial inductors mounted on but insulated from said disk, collector-rings mounted on but insulated from the periphery of said disk and connected with the inductors, brushes engaging said collector-rings, circuit connections to said brushes and to the inner ends of said inductors, and a magnet presenting opposite polar faces at the opposite sides of said disk.

10. In a dynamo-electric machine, the combination, substantially as set forth, of a shaft, a hub thereon, an iron core mounted on said hub and formed of a series of concentric laminations, a strengthening-hoop encircling said core, spokes engaging said hoop and core and hub, collector-rings encircling said hoop but insulated therefrom, substantially radial inductors carried by but insulated from said core and hoop and having their outer ends connected with said collector-rings, brushes engaging said collector-rings, circuit connections connecting with said brushes and with the inner ends of said inductors, and a magnet presenting opposite poles at the faces of said disk.

11. In a dynamo-electric machine, the combination, substantially as set forth, of a cylindrical pole having an axial bore and presenting polar surfaces at its end, a series of yokes secured to the periphery of said pole and provided with inturned arms presenting polar faces parallel with said first-mentioned polar faces, a shaft mounted axially in said cylindrical pole, and a disk-armature mounted on said shaft and adapted to rotate in the space between the polar faces of said pole and arms.

12. In a dynamo-electric machine, the combination, substantially as set forth, of a longitudinally-divided cylindrical pole having an axial bore and presenting polar surfaces at its end, a series of yokes secured to the periphery of said pole and provided with inturned arms presenting polar faces parallel with said first-mentioned polar faces, a shaft mounted axially in said cylindrical pole, and a disk-armature mounted on said shaft and adapted to rotate in the space between the polar faces of said pole and arms.

13. In a dynamo-electric machine, the combination, substantially as set forth, of a cylindrical pole having an axial bore and presenting polar faces at its ends, a series of yokes connected therewith and having inturned arms at their ends presenting polar faces parallel with the polar faces of said pole, a shaft mounted axially in said pole, and disk-armatures mounted on said shaft and adapted to rotate in the spaces between the polar faces of said pole and arms.

14. In a dynamo-electric machine, the combination, substantially as set forth, of a cylindrical pole having an axial bore and presenting polar faces at its ends, a series of yokes secured thereto and having inturned arms at their ends presenting polar faces opposite the polar faces of said pole, field-coils engaging the field-magnet formed by said pole and yokes and arms, a shaft axially mounted in said pole, and disk-armatures mounted on said shaft and adapted to rotate in the spaces between the polar faces of said pole and arms.

15. In a dynamo-electric machine, the combination, substantially as set forth, of a shaft, a disk-shaped iron core thereon, collector-rings on the periphery of said core, substantially radial inductors carried by said core and having their outer ends connected with said collector-rings, fixed brush-rings encircling said collector-rings, brushes carried by said brush-rings and engaging said collector-rings, circuit connections connected with said brush-rings and with the inner ends of said inductors, and a magnet presenting poles at the faces of said disk.

16. In a dynamo-electric machine, the combination, substantially as set forth, of a shaft, a substantially radial spoke-like inductor carried by said shaft, a pair of magnetic poles of opposite sign straddling the plane of revolution of said inductor, a second substantially radial inductor carried by said shaft, a pair of magnetic poles of opposite sign straddling the plane of revolution of said second inductor, main-circuit connections to the outer ends of both said inductors, and circuit connections between the inner ends of said inductors.

17. In a dynamo-electric machine, the combination, substantially as set forth, of a shaft, a series of substantially radial inductors carried thereby in equally-spaced angular planes, a pair of magnetic poles of opposite sign straddling said series of inductors, a second series of similar inductors carried by said shaft, a second pair of magnetic poles of opposite sign straddling said second series of inductors, main-circuit connections to the outer ends of an inductor of each of the two series, circuit connections between the outer ends of the remaining inductors, substantially as described, and circuit connections between the inner ends of the inductors substantially as described.

18. In a dynamo-electric machine, the combination, substantially as set forth, of a shaft, a series of collector-rings mounted side by side thereon, a plurality of substantially radial inductors connected with each collector-ring, the inductors of each ring being equally spaced and all the inductors together forming an equally-spaced series, magnetic poles straddling the plane of revolution of the inductors, and circuit connections, substantially as described, connected with said collector-rings and the inner ends of the inductors.

19. In a dynamo-electric machine, the combination, substantially as set forth, of a shaft, a pair of separated armatures mounted thereon and provided with substantially radial spoke-like inductors, a pair of magnetic poles of opposite sign straddling one of said armatures, a pair of magnetic poles of opposite sign straddling the second armature, main-circuit connections to the periphery of each armature, and circuit connections between the centers of the two armatures.

FRANCIS W. THROOP.

Witnesses:
 MARY RUTLEDGE,
 ALONZO W. HINGLER.